United States Patent [19]

Jarvis

[11] Patent Number: 4,504,234

[45] Date of Patent: Mar. 12, 1985

[54] AIDING MATHEMATICAL LEARNING

[75] Inventor: Arthur B. Jarvis, Shrewsbury, Mass.

[73] Assignee: Mathographics Research Corporation, Bedford, Mass.

[21] Appl. No.: 570,802

[22] Filed: Jan. 16, 1984

[51] Int. Cl.³ .............................................. G09B 19/02
[52] U.S. Cl. .................................... 434/188; 434/195; 434/208
[58] Field of Search ............... 434/188, 195, 196, 208, 434/187, 211

[56] References Cited

U.S. PATENT DOCUMENTS

| | | | |
|---|---|---|---|
| 205,960 | 7/1878 | Hill | 434/211 |
| 1,403,989 | 1/1922 | Verneau | 434/208 |
| 3,117,384 | 1/1964 | Billis | 434/208 |
| 3,208,162 | 9/1965 | Wisdom | 434/211 |
| 3,423,849 | 1/1969 | Jordan | 434/188 |
| 4,257,175 | 3/1981 | Wentworth | 434/208 |
| 4,332,567 | 6/1982 | Nogues | 434/195 |

FOREIGN PATENT DOCUMENTS

| | | | |
|---|---|---|---|
| 1031507 | 3/1953 | France | 434/211 |
| 919025 | 2/1963 | United Kingdom | 434/195 |
| 956490 | 4/1964 | United Kingdom | 434/195 |

*Primary Examiner*—William H. Grieb
*Attorney, Agent, or Firm*—Charles Hieken

[57] ABSTRACT

An aid for learning roots includes a flat surface with a number of unit squares inscribed inside a larger square surrounded by a border. The board surface contains loops for mating engagement with rectangular patches having hooks for being detachably secured to the loops. There are 25 square patches of a number of colors, each corresponding substantially to a unit square and 25 rectangular strips each of width 1/5 a square side dimension. A perfect cube with unit squares inscribed on its face nests inside three intersecting orthogonal planar surfaces each having unit squares inscribed in a square of the same size as a cube face and a rectangular edge strip.

5 Claims, 11 Drawing Figures

AIDING MATHEMATICAL LEARNING

The present invention relates in general to aiding learning and more particularly concerns novel apparatus and techniques for facilitating learning and practicing mathematical operations, such as taking roots. The invention is relatively inexpensive, yet enables people to learn and rapidly practice taking the roots of numbers.

It is an important object of the invention to provide improved apparatus and techniques for aiding learning.

According to the invention, there is means defining a plurality of contiguous congruent elements, and means defining subdivided congruent elements. According to a specific form of the invention, the congruent elements are squares typically defined in a square contiguous array surrounded by a border. Preferably, there is means for detachably securing individual squares to the array and means for detachably securing subdivided squares about a square array of squares.

In another specific form of the invention the equilateral elements are cubes, and there are three mutually perpendicular planar surfaces adapted to overlap by equal increments the edges of a perfect cube by the same incremental distance that is less than the side dimension of a unit cube.

Numerous other features, objects and advantages of the invention will become apparent from the following specification when read in connection with the accompanying drawing in which.

Figure 1:
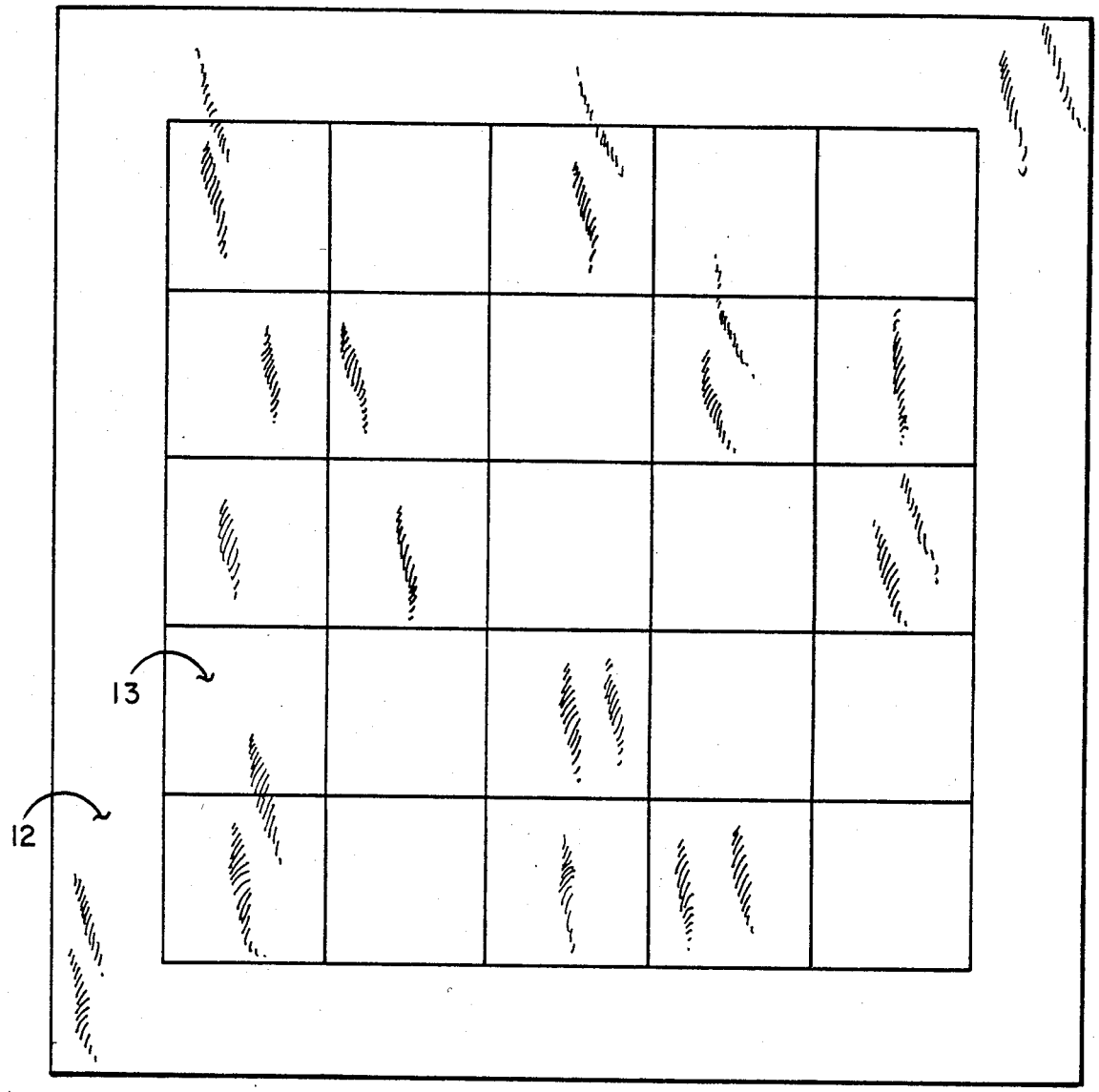
FIG. 1 is a plan view of a learning aid comprising a square block of contiguous squares surrounded by a border.

With reference now to the drawing and more particularly FIG. 1 thereof, there is shown a plan view of a surface inscribed with 25 contiguous squares and surrounded by a border 12 helpful in aiding learning square rooting according to the invention. The board 11 typically may comprise a square board made of plywood or other suitable material covered with a layer of black felt with a square of white felt 13 centered therein inscribed with an array of 25 squares that forms the loop portion of a hook and loop fastener for detachably securing smaller square or rectangular pieces to array 13.

Figures 2, 3:
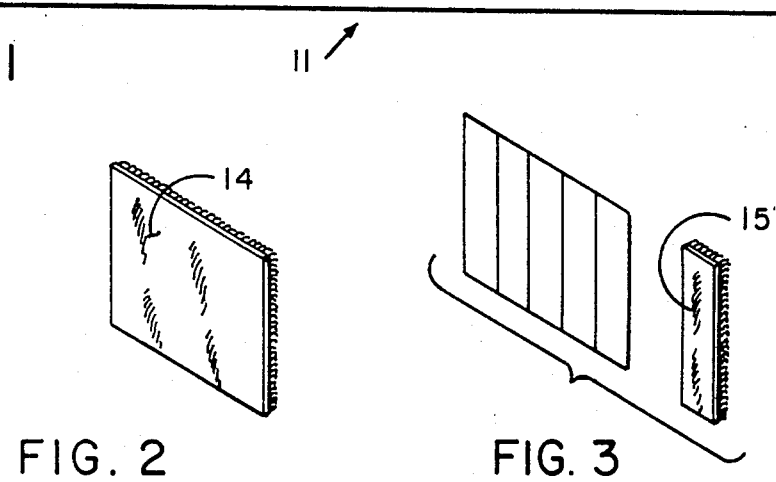
FIG. 2 is a plan view of a typical square detachably securable on the board of FIG. 1.
FIG. 3 is a plan view of a subdivided square.

Referring to FIG. 2, there is shown a square patch 14 typically backed with hook material for coaction with the loop material on board 11 to allow the square to be detachably secured. A square 14 may be fronted with loop material for mating engagement with hook material.

Referring to FIG. 3, there is shown a rectangular strip 15 also backed with hook material for coacting with the loop material on board 11 or patch 14 for being detachably secured thereto having a length corresponding to a side of patch 14 and a width typically one-fifth a side of square patch 14.

In a typical embodiment of the invention board 11 is 28" square with a 3" border, and each inscribed square is $4\frac{1}{2}$" on a side with each scribe mark $\frac{1}{4}$" deep by $\frac{1}{8}$" wide. Each patch 14 is typically 4" on a side. In a typical aid there are 25 of patches 14, preferably one red, three blue, five green, seven tan and nine orange. There are preferably 25 of strips 15 of color brown.

Having described the physical arrangement of a typical learning aid, its use in aiding the learning of square roots will now be described. The invention takes advantage of the realization that taking a square root involves answering the question what is the length of a side of a square of area corresponding to the number whose square root is to be determined. By recognizing that each such square may fit in the region between successive perfect squares, it is possible to subdivide the excess area over the smaller perfect square into a number of increments corresponding to the number of squares that must be added to the latter to form the next higher perfect square and distribute these subdivisions about the lower perfect square to approximate the square of area corresponding to the number whose square root is to be obtained. A perfect square has an area whose square root is an integer.

Figure 4A:
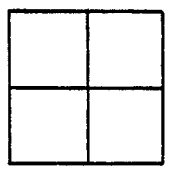
FIG. 4A shows a perfect square of area 4.
Figure 4B:
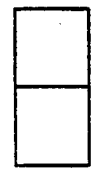
FIG. 4B shows an added area of two helpful in illustrating determining the square root of 6.

Consider now the example of determining the first approximation of $\sqrt{6}$. To build a square of area 6, begin with a perfect square of area 4 as shown in FIG. 4A and an added area of 2 shown in FIG. 4B. In aiding learning it would be convenient to locate four patches 14, preferably of the same color, in four contiguous squares of array 13, for example, green squares in the upper left hand corner of array 13. The excess area could be represented by two patches 14 of a different color, such as blue, located in the lower right hand corner of array 13.

Figure 5A:
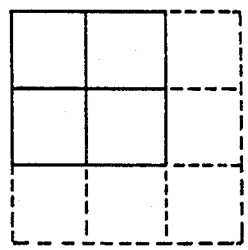
FIG. 5A shows the perfect square of area 4 adjacent five contiguous squares shown in dotted lines that when added form the next perfect square of area 9.
Figure 5B:
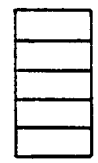
FIG. 5B shows how the area of two in FIG. 4B is divided into five equal rectangles each of width 2/5 and length 1.

The next perfect square has an area of 9($3^2$) and is formed by adding the five additional squares indicated in dotted outline in FIG. 5A. This addition could be indicated on board 11 by placing five tan patches 14 adjacent the four green patches substantially as shown in FIG. 5A. Divide the added area into five equal rectangular pieces, one piece for each of the five unit squares added to get the next perfect square, as shown in FIG. 5B, each strip being 2/5 wide and 1 long. This division could be represented on panel 11 by using ten of strips 15, each 1/5 wide and overlaying them over the two blue patches of FIG. 4B.

Figure 6:
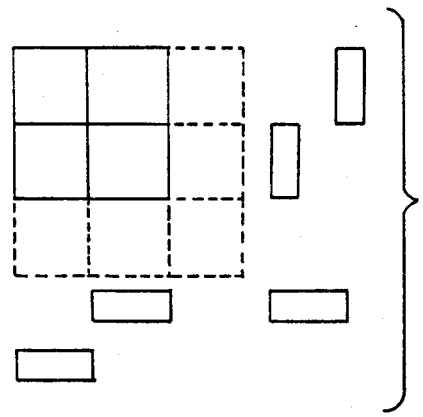
FIG. 6 shows the association of each rectangle in FIG. 5B with a corresponding one of the five added squares in dotted outline in FIG. 5A.
Figure 7:
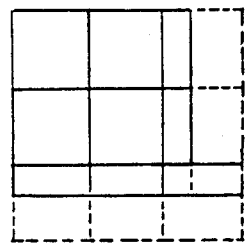
FIG. 7 shows how the rectangles are moved adjacent to the perfect square of area two to form an approximate square of side approximation the square root of 6.

Then the strips 15 may be removed and initially oriented as shown in FIG. 6 near a respective one of the five tan squares added to make the next perfect square. Then each pair of strips 15 positioned as in FIG. 6 may then be moved on a respective tan square as shown in FIG. 7 adjacent the green squares to form an approximation of a square of area 6. The person learning can immediately see that each side of the approximate square is 2 2/5 units long and conclude that the square root of 6 is approximately 2 2/5, or approximately 2.4

From the first approximation the actual determination was the exact square root of $(2+2/5)^2$ or $4+8/5+4/25$). Based on the binomial theorem $(a+b)^2=a^2+2ab+b^2$.

The general equation for the approximate method is $\sqrt{N}=a+(N-a^2)/2a+1$, where $a^2$ is the highest perfect square that is less than N. More accurate approximations may be made by adding pairs of zeros to the number whose root is to be determined and moving the decimal point to the left in the resulting approximate square root determined for each pair of zeros added.

The principles of the invention are also applicable to determining cube roots.

Figure 8:
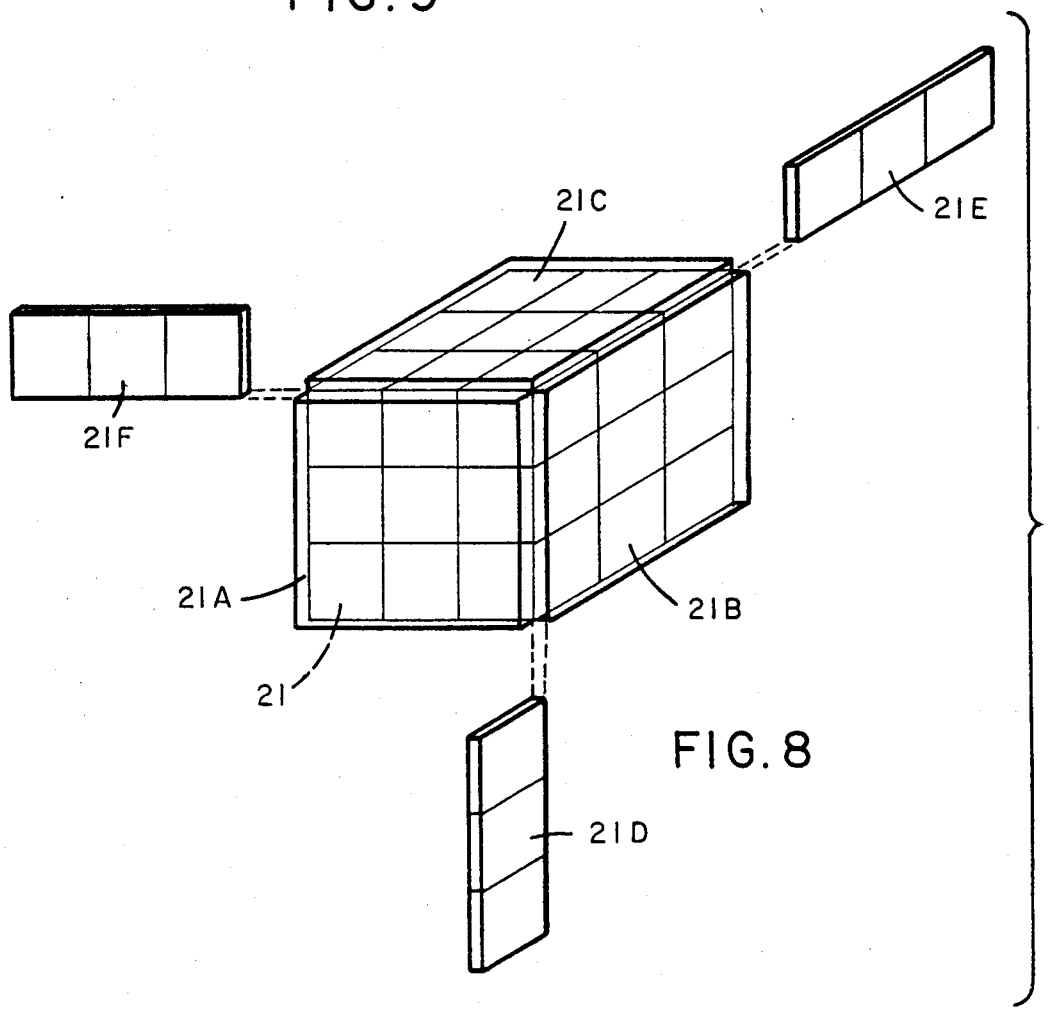
FIG. 8 shows a perfect cube and detachably securable elements helpful in aiding learning of cube rooting.

Referring to FIG. 8, there is shown a perfect cube and detachably securable elements helpful in aiding learning of cube rooting. Cube 21 is three units on each side formed of 27 unit cubes. There is also shown elements 21A, 21B and 21C detachably securable to respective orthogonal faces of perfect cube 21 as shown, each being three units by three units square and 1/37 unit thick. There is also shown elements 21D, 21E and 21F for fitting in the corners between elements 21A, 21B and 21C, respectively, as shown. These elements all fit within the region between perfect cube 21 and the next perfect cube four units on a side.

In general the number whose cube root is to be determined has a volume that lies between the volume of the perfect cube of side X and the perfect cube of side $X+1$. The added volume is divided by the number of unit cubes which must be added to make the volume of the cube $X+1$ on a side. Thus in general $\sqrt[3]{N}=X+(N-X^3)/3X^2+3X+1)$. Consider the example for determining $\sqrt[3]{28}$. The highest perfect cube below 28 is 27 with $X=3$. The next higher perfect square is 64, leaving an interval of 37 unit cubes to fill the space between perfect cubes. Dividing this one added cube into the 37 intervals involves adding 1/37 to 3 to determine the cube root of 28 as approximately 3 1/37 or 3.027. The exact value is 3.036589. Expressed analytically $\sqrt[3]{N} \approx X+(N-X^2)/(3X^3+3X+1)$. For the specific example, the cube root of $28=3+(28-27)/3 \cdot 3^2+3 \cdot 3+1)$.

Figure 9:
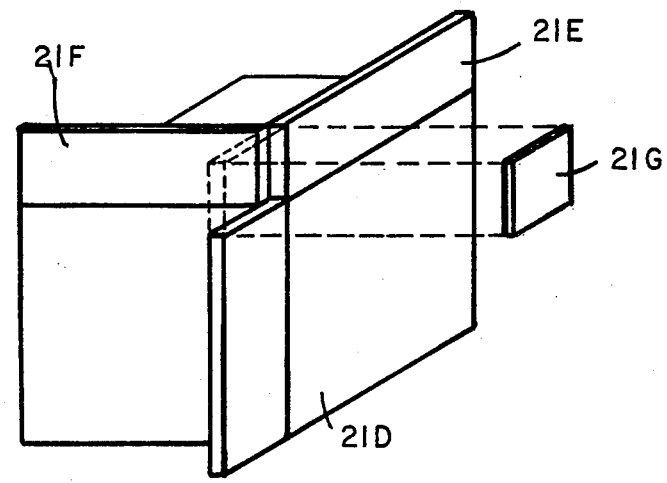
FIG. 9 shows detachably securable elements overlaying the perfect cube in FIG. 8 with a unit cube about to be positioned near a corner.

Thus, this approximate result is illustrated by positioning elements 21A–21F substantially as shown in FIG. 8 to form a cube of 3 1/37 with excess volume being represented by the portions of elements 21D, 21E and 21F extending beyond an adjacent surface, and the similar extension of element 21G in FIG. 9.

Referring to FIG. 9, there is shown elements 21D, 21E and 21F moved into position along the paths indicated by dotted lines in FIG. 8 showing this excess area and element 21G just before being moved into a position intersecting the latter three elements. These elements illustrate to the learner how the added volume may be divided on each side of the cube to determine the approximate cube root in the manner described above while the excess volume helps illustrate the additional volume for subdividing to obtain a still more accurate answer, for example, by adding three zeros to the number whose cube root is to be determined analogous to the techniques described above in connection with obtaining more accurate square roots.

There has been described novel apparatus and techniques for aiding learning, particularly of determining roots. The principles of the invention are applicable to aiding learning other mathematical principles, for example determining a root of any order. While the invention illustrates adding to a perfect square or cube, it is within the principles of the invention to subtract from a higher perfect cube. It is evident that those skilled in the art may now make numerous uses and modifications of and departures from the specific embodiments described herein without departing from the inventive concepts. For example, the structures may be of different materials and sizes. The means for detachably securing may be different, such as magnetic or pressure sensitive adhesives. The learning aids may be made without detachably securing the elements, for example, by printing illustrations. The learning aids may be formed of square and/or blocks. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for aiding mathematical learning comprising, means defining a plurality of contiguous congruent elements comprising contiguous unit squares, and overlaying means for overlaying at least some of said congruent elements to illustrate mathematical processing represented by the relationship between at least some of said congruent elements and said overlaying means, said overlaying means comprising a first plurality of overlaying elements each bounded by a square congruent with a said unit square and a second plurality of overlaying congruent elements each comprising a rectangle having a length equal to and a width a submultiple of the length of a side of a said unit square.

2. Apparatus for aiding mathematical learning in accordance with claim 1 wherein said first plurality of overlaying elements comprise, patch means detachably securable to said congruent elements, and said second plurality of overlaying elements comprise strip means for being detachably secured adjacent to respective ones of said congruent elements.

3. Apparatus for aiding mathematical learning in accordance with claim 1 wherein said means defining a plurality of contiguous congruent elements is a cube that is a perfect cube, and further comprising intersecting orthogonal planar surfaces each having a square area congruent with a respective face of said cube and having a contiguous strip area of width less than a predetermined dimension of each congruent element.

4. A method of aiding mathematical learning with the apparatus of claim 1 which method includes the steps of exposing said plurality of contiguous congruent elements to a learner, and positioning said overlaying means relative to at least some of said congruent elements to illustrate mathematical processing represented by the relationship between at least some of said congruent elements and said overlaying means, including the step of laying a plurality of said second overlaying elements along at least one edge of contiguous unit squares to form a rectangle of width corresponding to that the sum of each of the latter elements and length corresponding to the length of said edge.

5. A method of aiding mathematical learning in accordance with claim 4 and further including the step of laying a second plurality of said second overlaying elements along a second edge of said contiguous unit squares orthogonal to said first-mentioned edge to form a second rectangle of width corresponding to that of each of the latter elements and length corresponding to the length of said second edge, the length of said first and second edges being equal thereby helping the learner perceive a graphical representation of the relationship between a number and a root thereof.

* * * * *